US010882637B1

(12) United States Patent
Das et al.

(10) Patent No.: US 10,882,637 B1
(45) Date of Patent: Jan. 5, 2021

(54) SYSTEMS AND METHODS FOR SEARCH AND RESCUE LIGHT CONTROL FOR A ROTORCRAFT

(71) Applicant: HONEYWELL INTERNATIONAL INC., Morris Plains, NJ (US)

(72) Inventors: Shouvik Das, Bangalore (IN); Deepthi Sethuraman, Bangalore (IN); Anupama Srinivasulu, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/514,479

(22) Filed: Jul. 17, 2019

(51) Int. Cl.
B64D 47/04 (2006.01)
B64D 47/08 (2006.01)
B60Q 1/24 (2006.01)
G03B 15/00 (2006.01)

(52) U.S. Cl.
CPC ............ B64D 47/04 (2013.01); B64D 47/08 (2013.01); B60Q 1/24 (2013.01); G03B 15/006 (2013.01)

(58) Field of Classification Search
None
See application file for complete search history.

(56) References Cited

U.S. PATENT DOCUMENTS 5,589,901 A * 12/1996 Means ................... B64D 47/08
348/144
8,836,541 B2 9/2014 Fidanza
8,996,203 B2 * 3/2015 Jungwirth .............. B64D 47/02
701/3
2005/0149255 A1 7/2005 Vogel et al.
2007/0091609 A1 4/2007 Solberg et al.
2011/0137492 A1 * 6/2011 Sahasrabudhe ...... G05D 1/0676
701/3
2013/0182449 A1 * 7/2013 Fidanza ................. B64D 47/04
362/470
2016/0306363 A1 * 10/2016 Wang ....................... G01S 19/15
2017/0163888 A1 * 6/2017 Norland ............. H04N 5/23293
2018/0189971 A1 * 7/2018 Hildreth ............. H04N 21/4781
2019/0103030 A1 * 4/2019 Banga .................. G08G 5/0013

FOREIGN PATENT DOCUMENTS

CN 108924419 A 11/2018
EP 1683720 A2 7/2006
JP 2006027448 A 2/2006

* cited by examiner

Primary Examiner — Chikaodili E Anyikire
(74) Attorney, Agent, or Firm — Lorenz & Kopf, LLP

(57) ABSTRACT

Provided are systems and methods for controlling a search and rescue (SAR) light on a rotorcraft. The system includes a processor programmed to: for each cartesian input point in a sequence defining a cartesian pattern, determine an initial light head orientation as a function of the real-time rotorcraft state; generate and transmit a pan command and a tilt command as a function of the initial light head orientation and the cartesian input point; and identify a delta-range. A pan-tilt-zoom (PTZ) camera is configured to continuously slave and have a field of view centered on a beam axis of the SAR light. The PTZ camera captures a video stream and transmits it; zooms in on the field of view of the PTZ camera when the delta-range is positive; and zooms out on the field of view of the PTZ camera when the delta-range is negative.

18 Claims, 8 Drawing Sheets

SYSTEMS AND METHODS FOR SEARCH AND RESCUE LIGHT CONTROL FOR A ROTORCRAFT

TECHNICAL FIELD

The technical field generally relates to navigational aids, and more particularly relates to systems and methods for search and rescue light control for a rotorcraft.

BACKGROUND

Rotorcraft Searchlights are illumination apparatus mounted under the belly or chin of a rotorcraft. They generate a beam of light that may be used to illuminate a point of interest on the ground while the rotorcraft is in the air. When the direction/location of the searchlight beam of light is controlled, it may facilitate operations of search and rescue missions. Some conventional searchlight configurations are rigidly mounted, in which case the rotorcraft itself must maneuver in order to re-orient and control the direction/location of the searchlight beam of light. Other conventional searchlight configurations provide pan and tilt control to maneuver the direction/location of the searchlight beam of light on the ground, independent of the rotorcraft movement.

During a Search and Rescue (SAR) mission, the onus is generally on the pilot to control the searchlight beam of light and/or fly the rotorcraft to follow a predefined SAR pattern. These missions are dynamic and can be very technically difficult. For example, the rotorcraft may have to fly close to the terrain, in high crosswinds, etc. Maintaining the rotorcraft attitude while controlling the searchlight beam of light is cognitively demanding.

Moreover, maneuvering the direction/location of the searchlight beam of light on the ground is difficult under normal circumstances, even with searchlight configurations that provide pan and tilt control. This is because, in order to move from a point A to a point B on the ground, an operator generally must make multiple sequential movements, each being a combination of pan and tilt.

Accordingly, it is desirable to provide pilots with systems and methods that improve their control over the search and rescue lights, and that are simpler to use during these missions, easing the cognitive demand. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system to control a search and rescue (SAR) light on a rotorcraft, the SAR light configured to project a beam of light along a beam axis. The system includes: a pan control motor configured to cause the beam axis to pan responsive to a pan command; a tilt control motor configured to cause the beam axis to tilt responsive to a tilt command; a navigation system providing a real-time rotorcraft state, including a latitude, a longitude, and an orientation; a source of a cartesian pattern configured to supply a cartesian input point; a controller operationally coupled to the navigation system and the source of a cartesian pattern, the controller having a processor programmed to: receive the cartesian input point; determine an initial light head orientation as a function of the real-time rotorcraft state; generate a pan command and a tilt command as a function of the initial light head orientation and the cartesian input point; and transmit the pan command to the pan control motor and the tilt command to the tilt control motor; and a pan-tilt-zoom (PTZ) camera configured to slave with the beam axis and to continuously have a field of view centered on the beam axis, the PTZ camera configured to capture a video stream and transmit it.

A method for controlling a Search and rescue (SAR) light on a rotorcraft, the SAR light configured to project a beam of light along a beam axis, is provided. The method includes: at a controller having a processor programmed with a SAR program, performing the operations of: receiving real-time rotorcraft state data; receiving a cartesian input point; determining an initial light head orientation as a function of the real-time rotorcraft state; calculating a delta-orientation for the SAR light; generating a pan command and a tilt command as a function of delta-orientation for the SAR light; and transmitting the pan command and the tilt command; at a pan control motor, causing the SAR light to pan responsive to the pan command; at a tilt control motor, causing the SAR light to tilt responsive to the tilt command; and at a pan-tilt-zoom (PTZ) camera configured to slave with the beam axis and to continuously have a field of view centered on the beam axis, capture a video stream and transmit it.

Also provided is a system to control a search and rescue (SAR) light on a rotorcraft, the SAR light configured to project a beam of light along a beam axis. The system includes: a pan control motor configured to cause the beam axis to pan responsive to a pan command; a tilt control motor configured to cause the beam axis to tilt responsive to a tilt command; a navigation system providing a real-time rotorcraft state, including a latitude, a longitude, and an orientation; a source of a cartesian pattern including a plurality of cartesian input points in a sequence, the source of the cartesian pattern being selectable from among an input device, a flight management system, a memory device, and an external source; a controller operationally coupled to the navigation system and the source of cartesian pattern, the controller having a processor to: receive the cartesian pattern; and for each cartesian input point in the sequence defining the cartesian pattern, determine an initial light head orientation as a function of the real-time rotorcraft state; generate a pan command and a tilt command as a function of the initial light head orientation and the cartesian input point; transmit the pan command to the pan control motor and the tilt command to the tilt control motor; and identify a delta-range; and a pan-tilt-zoom (PTZ) camera configured to slave with the beam axis and to continuously have a field of view centered on the beam axis, the PTZ camera configured to: capture a video stream and transmit it; zoom in on the field of view of the PTZ camera when the delta-range is positive; and zoom out on the field of view of the PTZ camera when the delta-range is negative.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As used herein, control of a search and rescue (SAR) light (i.e., a device or apparatus that projects a searchlight beam of light) includes the desired control of the searchlight beam of light. As mentioned, SAR operations are cognitively and technically difficult tasks. The challenge of a SAR operation is further aggravated in situations in which the search area is not easy for the rotorcraft to maneuver in. A technical problem is presented in improving the tools and methods for controlling a SAR light so that a SAR operation can be completed efficiently and safely. Current navigational aids that are used as a solution to this technical problem have drawbacks, such as a reliance on spherical input coordinates to control the SAR light. The present invention introduces a novel technical solution and approach to this problem. In an embodiment, a system for SAR light control for a rotorcraft (FIG. 1, system 102) is provided. Core functionality provided by this disclosure includes:

Systems and methods that increase the likelihood that a rotorcraft can hover at one place and from there move the searchlight beam of light in accordance with a prescribed SAR pattern. This increases safety and completion of the prescribed SAR.

Systems and methods that can also be extended to all multi-rotors/rotorcrafts having SAR lights and cameras.

Systems and methods that give a lot of flexibility in searching and capturing images in a predefined pattern (such as the SAR pattern), so that the area of interest is well covered.

The proposed system for SAR light control for a rotorcraft 102 is an easy augmentation for any rotorcraft equipped with a smart searchlight (FIG. 1, 120) and does not require any special or additional instrumentation and equipage. The figures and descriptions below provide more detail.

Figure 1:
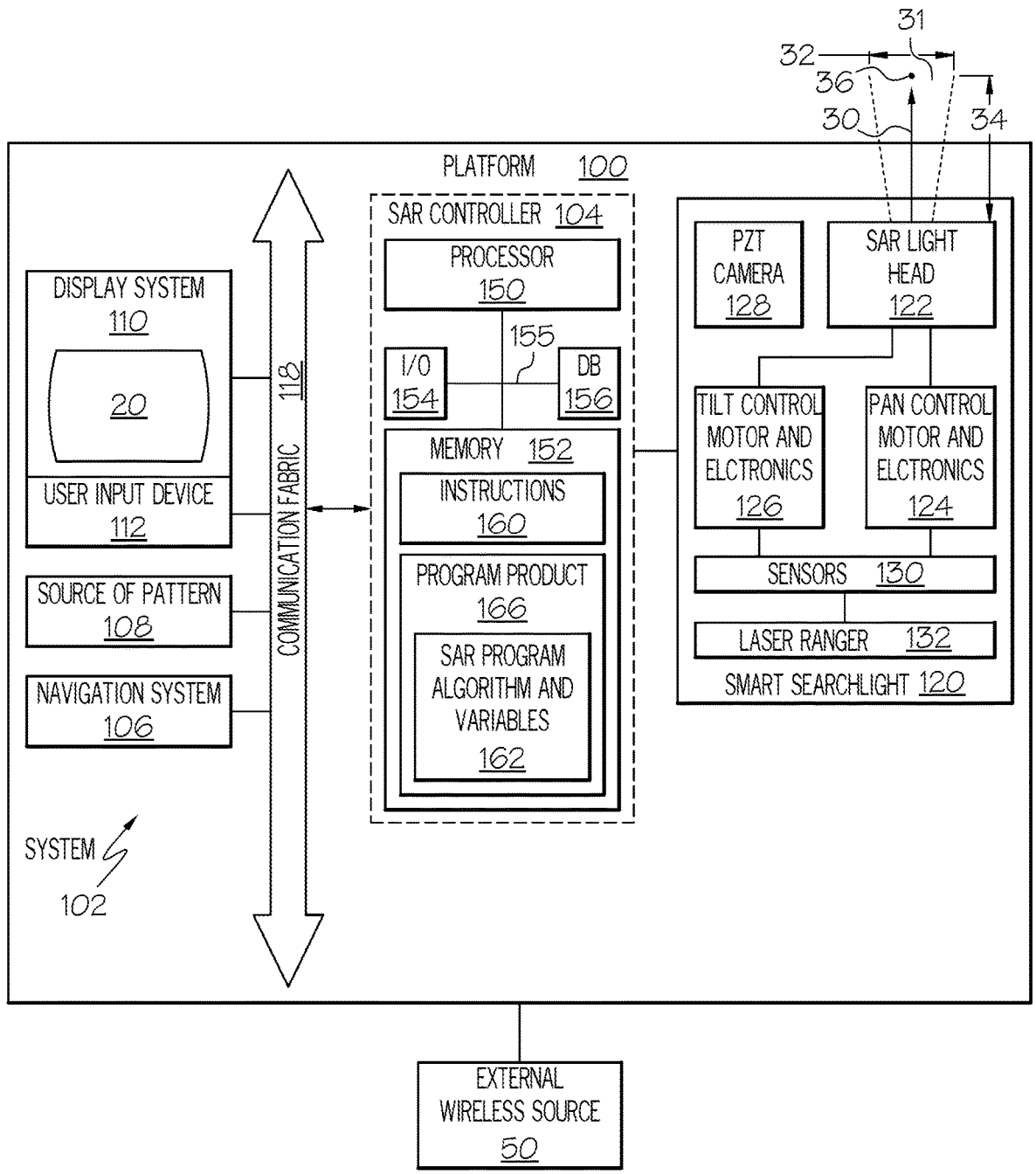
FIG. 1 is a block diagram of a system for search and rescue light control for a rotorcraft, in accordance with an exemplary embodiment.

Turning now to FIG. 1, exemplary embodiments of the system for SAR light control for a rotorcraft 102 (also referred to herein as "system" 102) is generally associated with a mobile platform 100. In various embodiments, the mobile platform 100 is a rotorcraft, and is referred to as rotorcraft 100. The system 102 provides a technical solution in the form of a search and rescue controller (FIG. 1, controller 104, also referred to herein as a SAR controller, and as a control module) embodying novel rules and parameters. In some embodiments, the controller 104 may be integrated within a preexisting mobile platform management system, avionics system, cockpit display system (CDS), flight controls system (FCS), or rotorcraft flight management system (FMS). Although the controller 104 is shown as an independent functional block, onboard the rotorcraft 100, in other embodiments, it may exist in an electronic flight bag (EFB) or portable electronic device (PED), such as a tablet, cellular phone, or the like. In embodiments in which the controller is within an EFB or a PED, a display system 110 and a user input device 112 may also be part of the EFB or PED.

The controller 104 may be operationally coupled to any combination of the following rotorcraft systems: a communication system and fabric 118; a rotorcraft inertial navigation system 106; a source of a cartesian pattern 108; a display system 110; a user input device 112; and, a smart searchlight apparatus 120. In some embodiments, the controller 104 is also operationally coupled to an external source 50 that communicates wirelessly with the controller 104. The functions of these rotorcraft systems, and their interaction, are described in more detail below.

In various embodiments, the smart searchlight apparatus 120 comprises a SAR light, called light head 122, that projects a three-dimensional beam of light 31 along a beam axis 30 to land on the ground (or a surface) at beam axis touchdown 36. The beam of light 31 generally surrounds the beam axis and extends uniformly therefrom in a radial direction. The orientation of the light head 122 and resulting beam axis 30, with respect to the rotorcraft 100, is controlled by one or both of a pan control motor 124 and electronics, and a tilt control motor 126 and electronics. Sensors 130 may detect orientation and configuration status of the light head 122 and convert this status information into electrical signals for processing. A laser ranger 132 is configured to determine the slant range 34 (shortened to range 34) from the light head 122 to the beam axis touchdown 36. Searchlight data collectively refers to range data and sensor data.

In some embodiments, a real-time rotorcraft state is described by state data generated by the rotorcraft inertial navigation system 106. The real-time rotorcraft state may therefore be described by any of: an instantaneous location (e.g., the latitude, longitude, orientation), an instantaneous heading (i.e., the direction the rotorcraft is traveling in relative to some reference), a flight path angle, a vertical speed, a ground speed, an instantaneous altitude (or height above ground level), and a current phase of flight of the rotorcraft 100. As used herein, "real-time" is interchangeable with current and instantaneous. The rotorcraft inertial navigation system 106 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. In various embodiments, the data referred to herein as the real-time rotorcraft state data may be referred to as navigation data. The real-time rotorcraft state data is made available, generally by way of the communication system and fabric 118, so other components, such as the controller 104 and the display system 110, may further process and/or handle the rotorcraft state data.

In various embodiments, the communications system and fabric 118 is configured to support instantaneous (i.e., real time or current) communications between on-board systems, the controller 104, and one or more external data source(s) 50. As a functional block, the communications system and fabric 118 may represent one or more transmitters, receivers, and the supporting communications hardware and software required for components of the system 102 to communicate as described herein. In various embodiments, the communications system and fabric 118 may have additional communications not directly relied upon herein, such as bidirectional pilot-to-ATC (air traffic control) communications via a datalink, and any other suitable radio communication system that supports communications between the rotorcraft 100 and various external source(s).

Figure 4A:
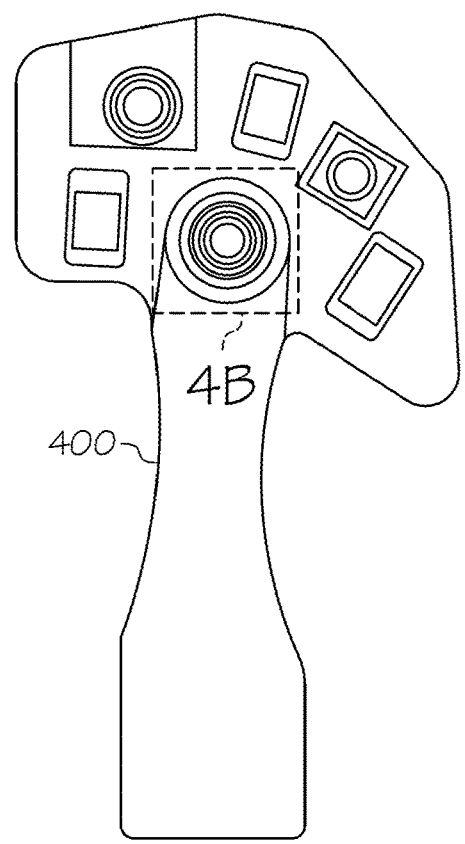
FIGS. 4A and 4B are an example of a collective stick grip, as may be used to provide manual input, accordance with an exemplary embodiment.
Figure 4B:
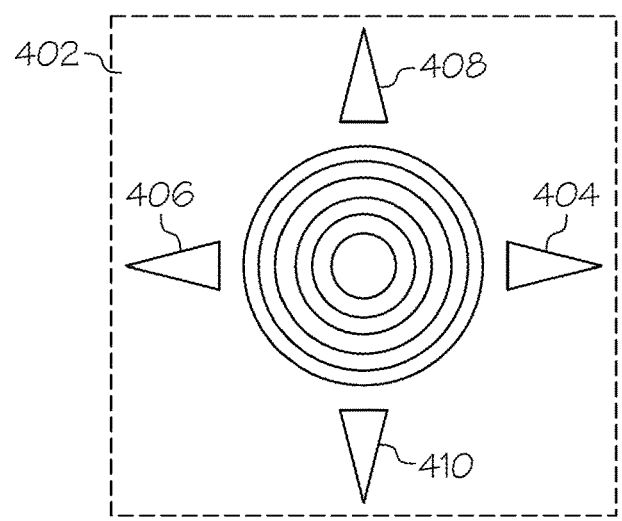
Figure 5A:
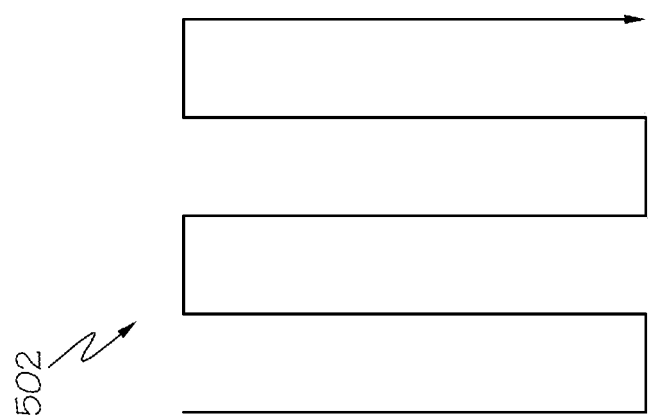
FIGS. 5A-5E illustrate a variety of search and rescue patterns for implementing in a cartesian coordinate system, accordance with an exemplary embodiment.
Figure 5B:
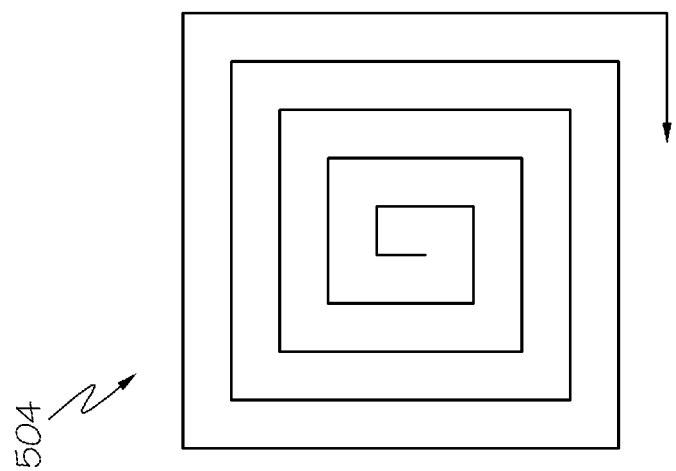
Figure 5C:
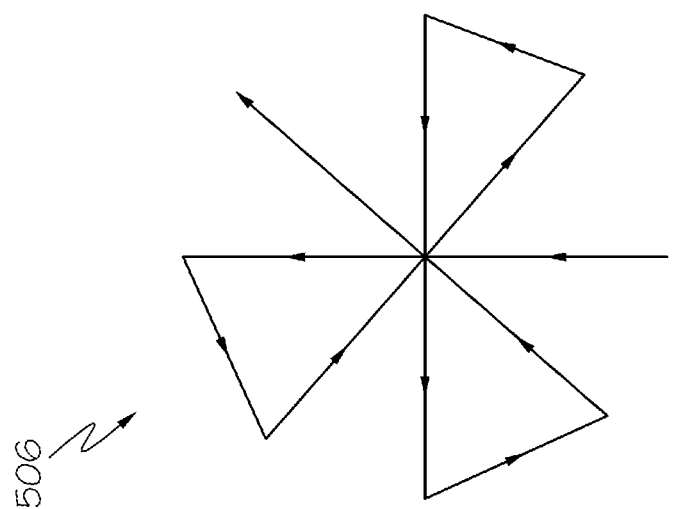
Figure 5D:
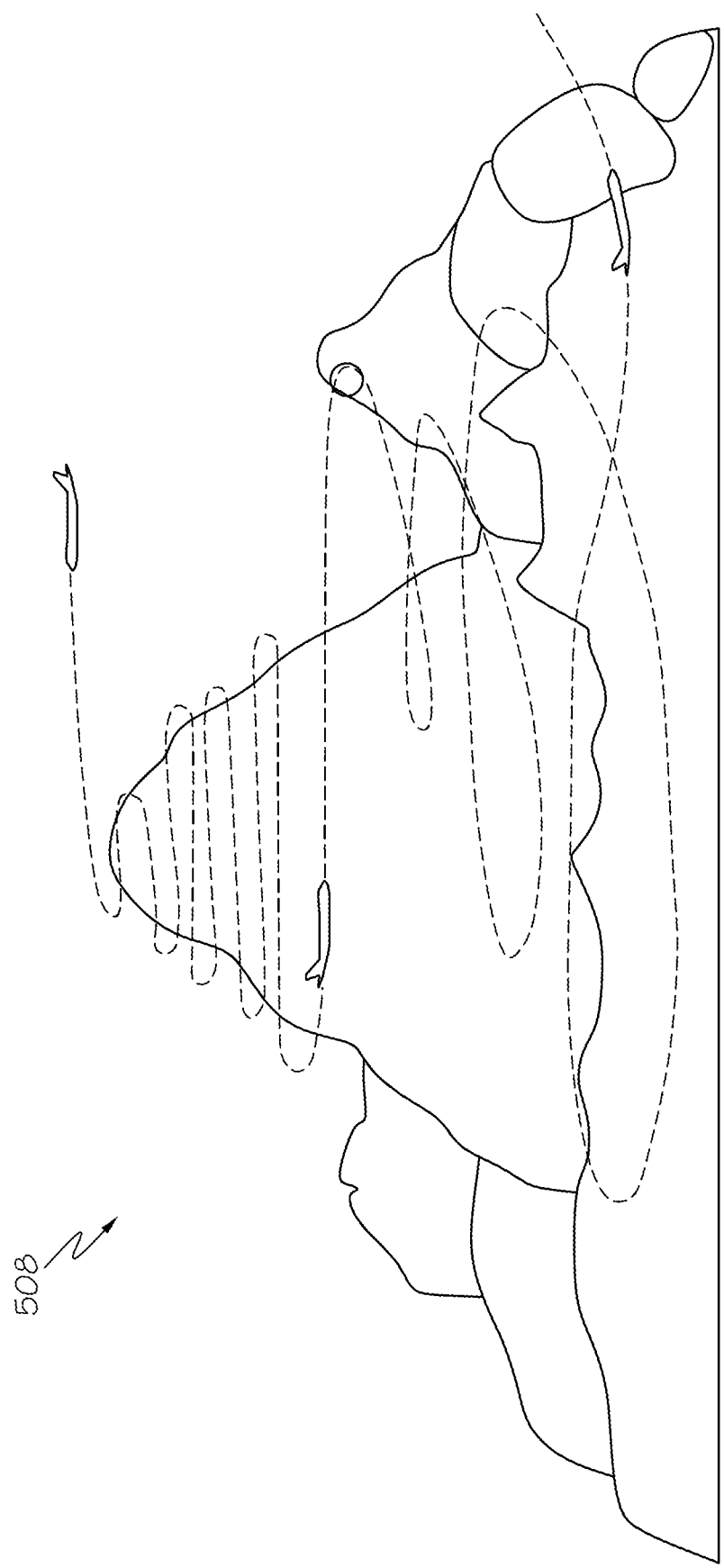
Figure 5E:
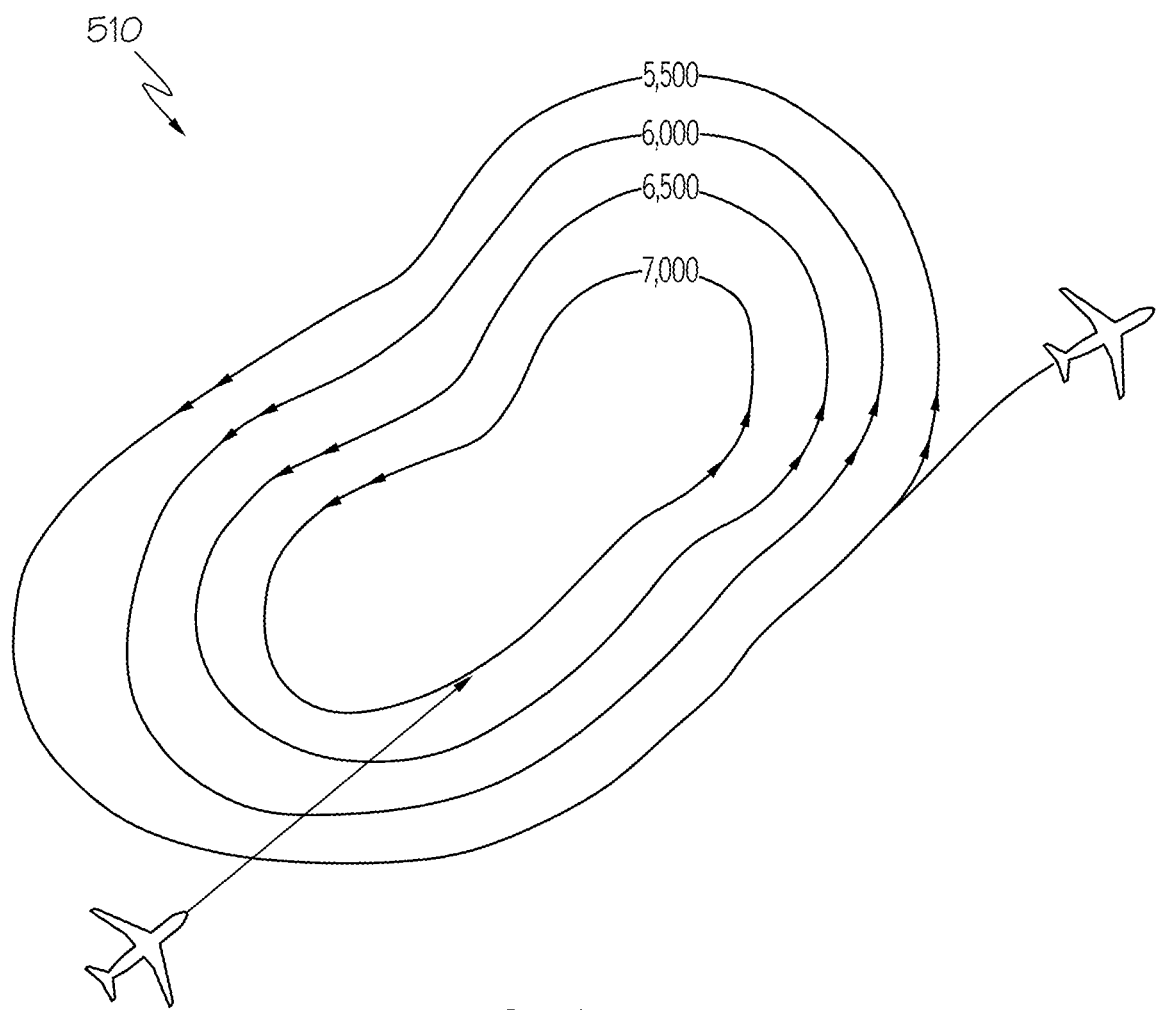

The user input device 112 and the controller 104 are cooperatively configured to allow a user (e.g., a pilot, co-pilot, or crew member) to interact with display devices in the display system 110 and/or other elements of the system 102, as described in greater detail below. Depending on the embodiment, the user input device 112 may be realized as a cursor control device (CCD), keypad, touchpad, keyboard, mouse, touch panel (or touchscreen), joystick, knob, line select key, voice controller, gesture controller, or another suitable device adapted to receive input from a user. As shown in FIG. 4, a common user input device 112 for searchlight control is called a collective stick grip 400, or thrust grip, having a hat switch 402. The hat switch can be manipulated in four directions (for example, right 404, left 406, forward 408, and reverse 410) sequentially, generating cartesian inputs that can be used by the controller 104 as described herein.

When the user input device 112 is configured as a touchpad or touchscreen, it may be integrated with the display system 110. As used herein, the user input device 112 may be used by a pilot to communicate with external sources, to modify or upload the program product 166, etc. In various embodiments, the display system 110 and user input device 112 are onboard the rotorcraft 100 and are also operationally coupled to the communication system and fabric 118. In some embodiments, the controller 104, user input device 112, and display system 110 are configured as a control display unit (CDU).

The controller 104 may be said to display various images and selectable options described herein. In practice, this may mean that the controller 104 generates display commands, and, and the display system 110, responsive thereto, causes the display device 20 to render thereon the various graphical user interface elements, tables, icons, alerts, menus, buttons, and pictorial images, as described herein. Display methods include various types of computer-generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes.

The display system 110 is configured to continuously receive and process the display commands from the controller 104. In various embodiments described herein, the display system 110 includes a synthetic vision system (SVS). In exemplary embodiments, the display device 20 is realized on one or more electronic display devices, such as a multi-function display (MFD) or a multi-function control display unit (MCDU), configured as any combination of: a head up display (HUD), an alphanumeric display, a vertical situation display (VSD) and a lateral navigation display (ND).

A pan-tilt-zoom (PTZ) camera 128 is configured to slave with the light head 122; specifically, PTZ camera 128 is configured to slave (i.e., orient concurrently and continuously) with the beam axis 30, and to have a field of view FOV 32 that is centered on the beam axis 30. The PTZ camera 128 is responsive to controller 104 commands for when to capture a video stream and when to cease capturing a video stream. The PTZ camera 128 is configured to capture the video stream and transmit it to the display system 110. It is understood that the PTZ camera 128 capably functions at the ranges 34 of which the smart searchlight apparatus 120 is used.

The controller 104 performs the functions of the system for SAR light control for a rotorcraft 102. As used herein, the term "controller" may be interchanged with the term "module;" each refers to any means for facilitating communications and/or interaction between the elements of the system 102 and performing additional processes, tasks and/or functions to support operation of the system 102, as described herein. In various embodiments, the controller 104 may be any hardware, software, firmware, electronic control component, processing logic, and/or processor device, individually or in any combination. Depending on the embodiment, the controller 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the controller 104 is depicted as a computer system comprising a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external source during an initialization step of a process; it may also be programmed via a user input device 112. During operation, the processor 150 loads and executes one or more programs, algorithms and rules embodied as instructions and applications 160 contained within the memory 152 and, as such, controls the general operation of the controller 104 as well as the system 102.

The novel search and rescue (SAR) program 162 includes rules and instructions. The processor 150 loads the SAR program 162 (thereby being programmed with the SAR program 162). When the processor 150 executes the SAR program 162, this causes the controller 104 to perform the functions, techniques, and processing tasks associated with the operation of the system 102. The SAR program 162 directs the processing of searchlight data with real time navigation data and cartesian input (e.g., loci) to determine differences/deviations between past, current, and intended next positions, orientations and ranges, as described hereinbelow. Novel program 162 and associated stored variables 164 may be stored in a functional form on computer readable media, for example, as depicted, in memory 152. While the depicted exemplary embodiment of the controller 104 is described in the context of a fully functioning computer system, those skilled in the art will recognize that the mechanisms of the present disclosure are capable of being distributed as a program product 166.

As a program product 166, one or more types of non-transitory computer-readable signal bearing media may be used to store and distribute the SAR program 162, such as a non-transitory computer readable medium bearing the SAR program 162 and containing therein additional computer instructions for causing a computer processor (such as the processor 150) to load and execute the SAR program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory 152 and as program product time-based viewing of clearance requests in certain embodiments.

In various embodiments, the processor/memory unit of the controller 104 may be communicatively coupled (via a bus 155) to an input/output (I/O) interface 154, and a database 156. The bus 155 serves to transmit programs, data, status and other information or signals between the various components of the controller 104. The bus 155 can be any suitable physical or logical means of connecting computer systems and components. This includes, but is not limited to, direct hard-wired connections, fiber optics, infrared and wireless bus technologies.

The I/O interface 154 enables intra controller 104 communication, as well as communications between the controller 104 and other system 102 components, and between the controller 104 and the external data sources via the communication system and fabric 118. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 118 and obtains data from external data source(s) directly. Also, in various embodiments, the I/O interface 154 may support communication with technicians, and/or one or more storage interfaces for direct connection to storage apparatuses, such as the database 156.

In some embodiments, the database 156 is part of the memory 152. In various embodiments, the database 156 is integrated, either within the controller 104 or external to it. Accordingly, in some embodiments, cartesian patterns and/or terrain maps are pre-loaded and internal to the controller 104.

Figure 2:
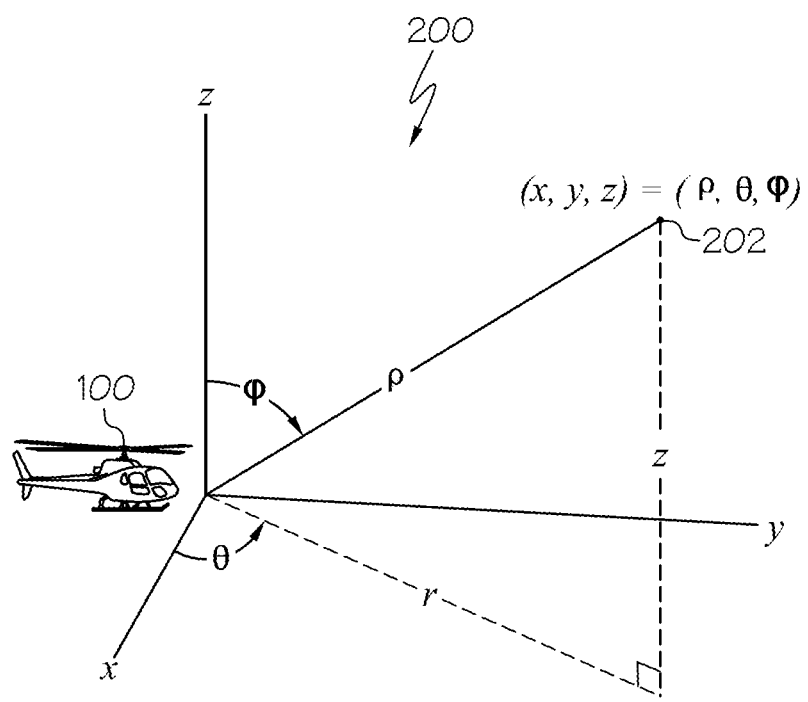
FIG. 2 is an image showing the conversion between a spherical coordinate system and a cartesian coordinate system.

Turning now to the three-dimensional image 200 indicated in FIG. 2, rotorcraft 100 is shown at the origin of a cartesian coordinate system, with a beam of light projecting out to a point 202. Traditional searchlights with independent pan and tilt control are generally controlled in spherical coordinates. Using spherical coordinates, the orientation of the beam of light projecting out to point 202, with respect to the earth, is described in terms elevation ($\theta$) (measured from the X axis) and azimuth ($\psi$) (measured from the Z axis). The elevation ($\theta$) and azimuth ($\psi$) are controlled by pan and tilt angles. Further, to describe the location of point 202, the slant range $\rho$ is used. Therefore, the location of point 202 defined in the cartesian coordinate system as (x, y, z), can be translated to the 3-tuple $\{\rho, \theta, \psi\}$ in the spherical coordinate system.

Figure 3:
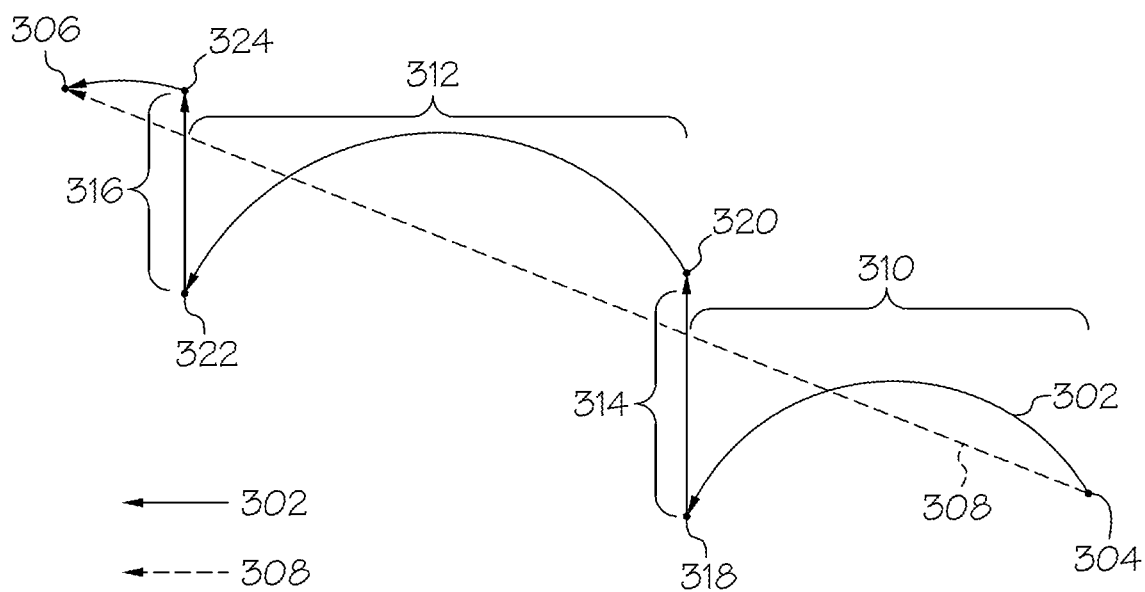
FIG. 3 is an image showing the difficulty of controlling a light beam to move along a straight-line using pan and tilt controls.

The task of tracing out a straight-line using pan and tilt is much more challenging, particularly when a searchlight light head 122 is to be panned with a non-zero tilt, as shown in FIG. 3. In FIG. 3, the ideal locus 308 is a dashed straight-line from A 304 to B 306. The ideal locus 308 represents a desired path made by the beam axis touchdown 36 (i.e., the point at which the beam axis intersects with the ground).

However, the actual locus 302 from a searchlight light head 122 panned with a non-zero tilt is parabolic, as shown with the heavy line from A 304 to B 306. As can be seen with actual locus 302, moving the beam axis touchdown 36 from A 304 to B 306 requires multiple sequential pan and tilt maneuvers. For example, moving from A 304 to B 306 involves a first pan 310 moving the beam axis touchdown from A 304 to A' 318. A first tilt 314 moves the beam axis touchdown from A' to A" (point 320), a second pan 312 moving the beam axis touchdown to A'" (point 322) and a second tilt 316 moving the beam axis touchdown to A"" (point 324). And so on. As can be seen with the actual locus 302, the task of tracing out a straight-line from A 304 to B 306 (the ideal locus 308) using pan and tilt is very inefficient and inaccurate.

As mentioned, the provided system 102 can (1) perform this task and achieve the desired locus; and, (2) can perform this task by receiving cartesian inputs. The SAR controller 104 receives cartesian inputs for slew commands (as used herein, the slew command collectively refers to the directional input commands, or commands to move the light head in a certain way) from the operator/pilot an interprets the cartesian inputs as requests to make straight lines on the ground; Concurrent with receiving the cartesian input, the system 102 simultaneously generates respective azimuth and elevation commands for controlling the light head 122 (and its beam axis 30) in accordance with the cartesian input slew commands.

A cartesian pattern may be considered a plurality of cartesian input points that are arranged in a unique sequence that defines the cartesian pattern. Accordingly, the source of a cartesian pattern 108 provides at least one cartesian input point to the controller 104. In some embodiments, the source of a cartesian pattern 108 is a manual input device such as the stick or hat switch 402 shown in FIG. 4. Responsive to cartesian input sequentially provided, the controller 104 controls the light head and the pilot's experience is an improved human-machine experience, in that he is operating the searchlight controls in cartesian convention and having a resultant straight-line locus on the ground.

In the above example embodiment, the source of cartesian pattern 108 is a user input device, and the method of input of the cartesian pattern is one point at a time, sequentially. However, the system 102 is not just limited to manual input, nor is it limited to drawing straight lines. The system 102 is additionally capable of receiving a complete cartesian pattern (e.g., in bulk) comprised of a plurality of cartesian inputs having a specific sequential order, storing the complete cartesian pattern, and implementing the complete cartesian pattern, point by point, without further manual interaction.

In various embodiments, the source of a cartesian pattern 108 is selectable and flexible, such that the controller 104 can receive cartesian patterns from one or more of: a memory device 152, a flight management system, and other on-board systems. In various embodiments, the source of a cartesian pattern 108 is also selectable and flexible, such that the controller 104 can receive cartesian patterns additionally from an external source 50, which provides the cartesian pattern via a wireless connection. Most patterns that can be described in cartesian coordinates can be reproduced with the movement of the light head 122 by the SAR controller 104.

In other embodiments, the source of a cartesian pattern 108 is a flight management system. In still other embodiments, the source of a cartesian pattern 108 is a wireless data link from an external source 50. In various embodiments, the controller 104 is programmed to receive cartesian input points from all the above potential sources of a cartesian pattern 108.

An advantage of being able to implement a cartesian pattern is that search and rescue patterns are often drawn in a cartesian system. As shown in FIGS. 5A-5E, there are many established search and rescue patterns, which may then be manually modified to scale to the area to be searched. In an XY plane, a creeping line 502 looks like a digital wave from left to right. An expanding square 504 begins with a small square and then wraps around itself in subsequent squares, each bigger and encompassing the previous ones. A sector 506 looks something like a pinwheel, in which the rotorcraft 100 crosses over a middle point repeatedly. Some three-dimensional search and rescue patterns include a contour search 508 and a plan view 510. In each of the three-dimensional cartesian patterns, the rotorcraft begins at one altitude and sequentially descends in altitude.

In various embodiments, the complete predefined SAR patterns are stored for reference. They may be stored in the memory 152, the database 156, and/or be stored in the SAR program 162. In various embodiments, the complete predefined SAR patterns are provided by the source of cartesian pattern 108. In various embodiments, the complete predefined SAR patterns are provided by the external source 50. Regardless of how the controller 104 obtains the complete predefined SAR patterns, the controller 104 may render a menu of available predefined SAR patterns for a pilot to select and activate in the cockpit. In various embodiments, the controller 104 commands the onboard display system 110 to render images of available SAR patterns and to provide the pilot with an ability to select a desired one from among them.

In various embodiments, the PTZ camera 128 is utilized during the search and rescue operation. The PTZ camera 128 is configured to slave with the beam axis 30. As the rotorcraft 100 is stationary and the beam of light 31 scans the ground in accordance with the search pattern, the PTZ camera 128 can be utilized to capture video images of terrain and objects within the beam of light 31. The controller 104 may then command the display system 110 to display the video images on the display system 110, which improves the human-machine interface, and optimizes the efficiency of the search and rescue operation.

Notably, the SAR light control that is provided by the present invention offers a number of advantages over conventional search and rescue systems. First, the amount of time that a rotorcraft 100 can be stationary while executing a selected cartesian pattern can be maximized because the control of the light head 122 is no longer manual. In contrast, conventional search and rescue systems require the rotorcraft to fly and execute the pattern. As search and rescue operations are often performed in rugged territory, this increases safety. Next, the video images provided by the PTZ camera 128 as configured provide valuable SAR information.

Figure 6:
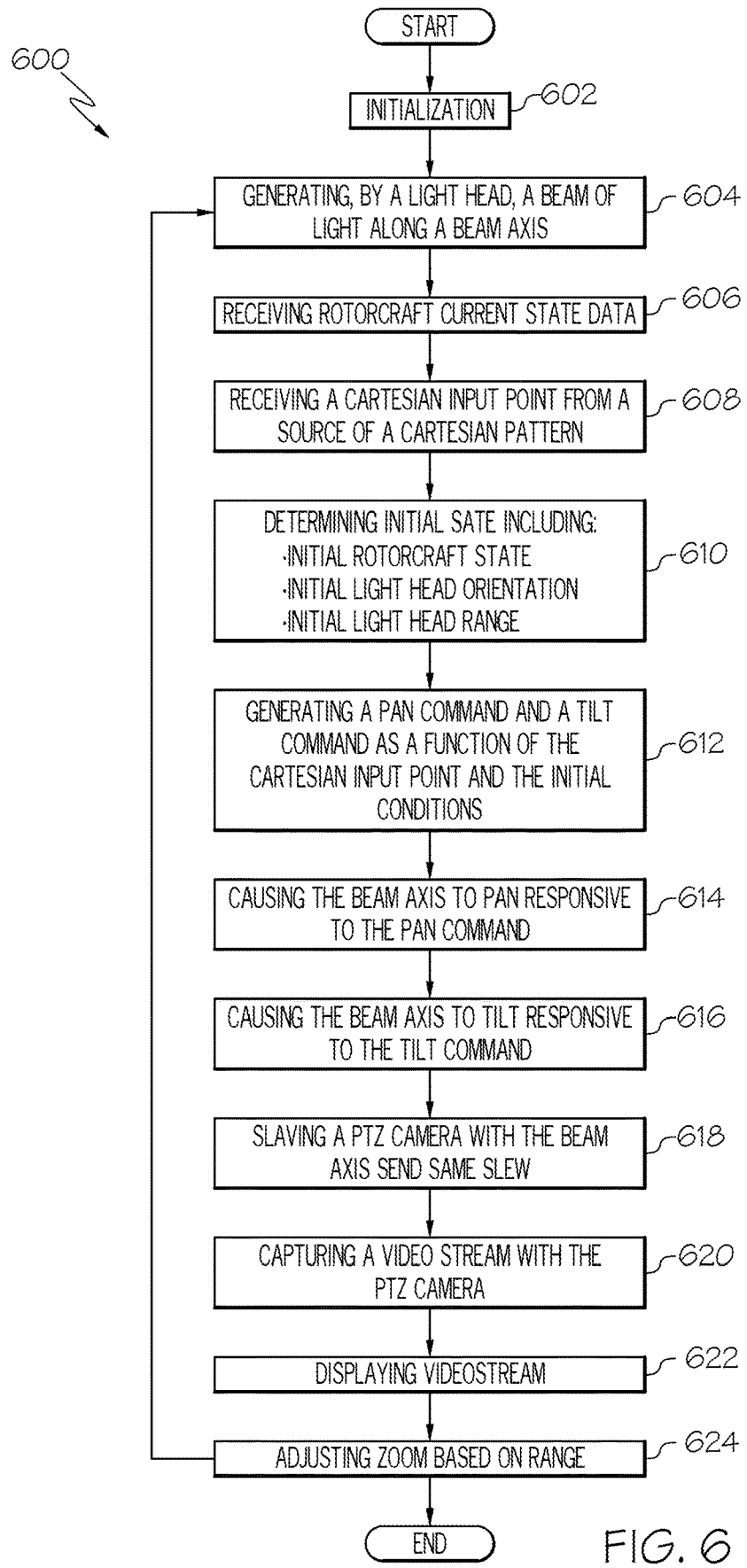
FIGS. 6-7 depict a method for search and rescue light control for a rotorcraft, in accordance with an exemplary embodiment.

The system 102 may make its determinations and selections in accordance with a method such as method 600 of FIG. 6. With continued reference to FIGS. 1-5, a flow chart is provided for a method 600 for providing a system 102, in accordance with various exemplary embodiments. Method 600 represents various embodiments of a method for adaptive clearance request prediction. For illustrative purposes, the following description of method 600 may refer to elements mentioned above in connection with FIG. 1. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 if the intended overall functionality remains intact.

The method starts, and at 602 the controller 104 is initialized and the system 102 is in operation. Initialization may comprise uploading or updating instructions and applications 160, program 162, parameters, pre-programmed thresholds, lookup tables, and formatting instructions. Parameters may include, for example, configurable, pre-programmed range and orientation thresholds, parameters for setting up a user interface, and the various shapes, various colors and/or visually distinguishing techniques used for renderings on the display system 110. In some embodiments, program 162 includes additional instructions and rules for rendering information differently based on type of display device in the display system 110.

At 404, rotorcraft state data is continuously obtained from the rotorcraft inertial navigation system 106. At 604, a light head 122 generates a beam of light 31 along a beam axis 30. At 606 rotorcraft current state data is received. At 608 a cartesian input point is received from the source of a cartesian pattern 108. As mentioned, in some embodiments, the cartesian pattern may be manually created, comprised of multiple cartesian input points entered sequentially. In an embodiment, the cartesian input point is provided via a collective stick grip 400.

At 610, responsive to receiving the cartesian input point, the method determines an initial state at a time $t_o$. The initial state is used as a starting point for movement in the cartesian coordinate system. Therefore, the initial state includes, for time $t_o$: rotorcraft state data, a light head orientation and a light head range. The initial light head orientation may be determined as a function of the real-time rotorcraft state, due to its location on the rotorcraft 100.

At 612, the controller 104 processes the initial state and the cartesian input point to identify a delta between them, which is a measure of how to move the light head 122 to get from its initial state to its desired state at the cartesian input point. One or more deltas can be created at 612. For example, at 612, the controller 104 calculates at least a delta-orientation for the light head 122 this measure defines how to turn a face of the light head 122 to direct the beam axis. In some embodiments, at 612, the controller 104 calculates a delta-orientation and a delta-range, the delta-range is a measure of how to change the distance 34. In various embodiments, responsive to a delta-range, the controller 104 commands the PTZ camera 128 to adjust, such as: to zoom in on the field of view of the PTZ camera 128 when the delta-range is positive; and to zoom out when the delta-range is negative. In various embodiments, the control module 104 keeps the field of view of the video stream constant by automatically changing the zoom value based on the delta-range.

With respect to directing the beam of light 31 and controlling the light head 122, at 612, the controller 104 generates a pan command and a tilt command as a function of the one or more deltas. At 614, the pan control motor 124 causes the light head 122 (and beam axis 30) to pan responsive to the pan command. At 616, the tilt control motor 126 causes the light head 122 (and beam axis 30) to tilt responsive to the tilt command. Data from the sensors 130 may be processed to confirm the desired pan and tilt movements have been performed.

In other embodiments, at 612, the controller 104 calculates a delta-orientation, a delta-range, and one or more delta-rotorcraft state data (a deviation in three-dimensional space, for example, delta-latitude and delta-longitude, delta-attitude, delta altitude, etc.). When a delta-latitude, delta-longitude, delta attitude, or the like, are calculated, they are compared to a respective predefined threshold. The predefined thresholds are selected to define stability of the rotorcraft. Therefore, if the controller 104 determines that the rotorcraft deviates in three-dimensional space more than a respective predefined threshold, the controller 104 will adjust pan and tilt commands to keep the beam axis on the selected pattern.

At 618 the PTZ camera 128 is slaved with the beam axis 30. In other words, as the beam axis 30 moves around, the PTZ camera also reorients, such that a field of view of the PTZ camera 128 (not shown) is always centered around the beam axis 30. At 620, the PTZ camera 128 captures a video stream and transmits it. At 622, the display system 110 may receive the video stream and display it for a user to observe in real time. At 622, the display system 110 may adjust a zoom value of the PTZ camera responsive to a delta-range. After 624, the method may return to 604 or end.

Figure 7:
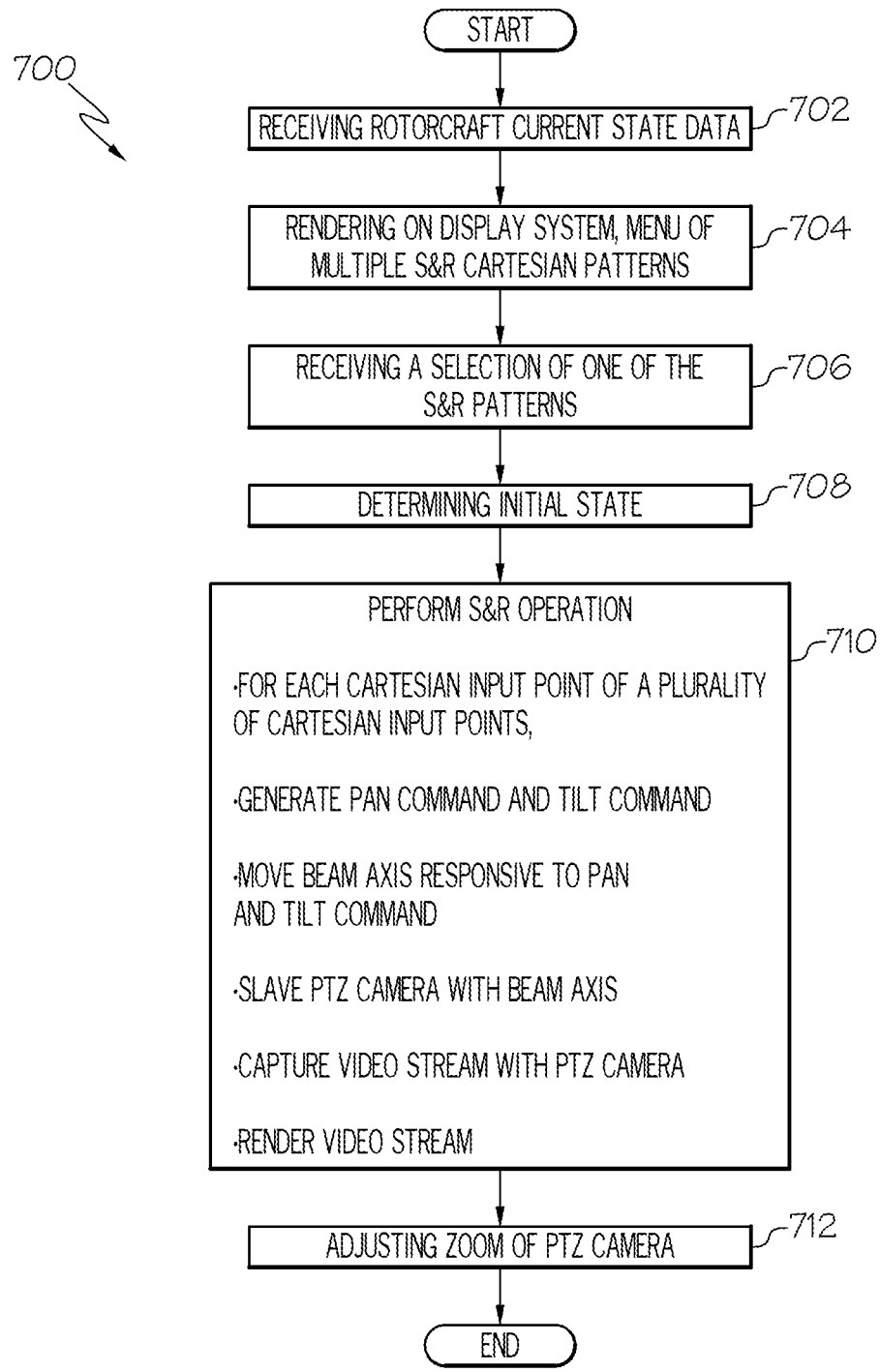

As mentioned, the source of a cartesian pattern 108 can provide, in bulk, a plurality of sequential discrete cartesian input points constituting a complete cartesian pattern, such as one of the search and rescue patterns described in connection with FIG. 5. In these embodiments, a method such as method 700 of FIG. 7 might be utilized. At the start of method 700, it is assumed that the method is initialized and that the light head 122 is configured to generate a beam of light along the beam axis 30, as described. At 702, the rotorcraft current state data is received. At 704, a menu of multiple different available SAR cartesian patterns is rendered on the display system 110. At 706, the method receives a user selected SAR cartesian pattern from among the multiple available SAR patterns.

At 708, the initial states are determined as previously described. At 710, the method begins performing a SAR operation in accordance with the selected SAR pattern. In other words, at 710, for each cartesian input point of a plurality of cartesian input points constituting the selected SAR pattern, the method sequentially generates a pan command and a tilt command, moves the beam axis as described above, and slaves the PTZ camera 128. The PTZ camera 128 captures a video stream and the video stream is rendered on the display system 110. It is significant to note that the performance of the complete SAR pattern, from the first point in the pattern to the last point in the pattern, at 710, happens automatically and without manual input, thus enabling the pilot to view captured video images or attend to other tasks. At 712, the display system 110 may adjust a zoom value of the PTZ camera responsive to a delta-range. At the end of the SAR operation at 712, the method may end or repeat.

Thus, the proposed systems and methods for SAR light control for a rotorcraft are technologically improved over conventional approaches to SAR systems for a rotorcraft. The system for SAR light control for a rotorcraft 102 enables easy augmentation for any rotorcraft equipped with a smart searchlight and does not require any special or additional instrumentation and equipage. As is readily appreciated, the above examples of the system 102 are non-limiting, and many others may be addressed by the SAR controller 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system to control a search and rescue (SAR) light on a rotorcraft, the SAR light configured to project a beam of light along a beam axis, the system comprising:
    a pan control motor configured to cause the beam axis to pan responsive to a pan command;
    a tilt control motor configured to cause the beam axis to tilt responsive to a tilt command;
    a navigation system providing a real-time rotorcraft state, including a latitude, a longitude, and an orientation;
    a source of a cartesian pattern configured to supply a cartesian input point;
    a controller operationally coupled to the navigation system and the source of a cartesian pattern, the controller having a processor programmed to:
        receive the cartesian input point;
        determine an initial light head orientation as a function of the real-time rotorcraft state;
        generate a pan command and a tilt command as a function of the initial light head orientation and the cartesian input point; and
        transmit the pan command to the pan control motor and the tilt command to the tilt control motor; and
    a pan-tilt-zoom (PTZ) camera configured to slave with the beam axis and to continuously have a field of view centered on the beam axis, the PTZ camera configured to capture a video stream and transmit it; and
    wherein the cartesian input point is a one of a plurality of cartesian input points in a sequence defining the cartesian pattern, and the processor is further programmed to:
    for each cartesian input point in the sequence defining the cartesian pattern,
        identify a delta-range;
        generate a respective pan command and a respective tilt command;
        zoom in on the field of view of the PTZ camera when the delta-range is positive; and
        zoom out on the field of view of the PTZ camera when the delta-range is negative.

2. The system of claim 1, wherein generating the pan command and the tilt command includes generating an elevation and an azimuth with respect to the earth.

3. The system of claim 2, wherein the processor is further programmed to:
    determine that the rotorcraft has deviated in three-dimensional space by more than a predefined threshold; and
    adjust pan and tilt commands accordingly.

4. The system of claim 3, wherein the SAR light and the PTZ camera are each further configured as dual spectrum with visible light and infra-red light.

5. The system of claim 4, further comprising a display system configured to receive the video stream and display it.

6. The system of claim 5, wherein the source of a cartesian pattern is a manual input device.

7. The system of claim 6, wherein the manual input device is a collective stick grip.

8. The system of claim 5, wherein the source of a cartesian pattern is a flight management system.

9. The system of claim 5, wherein the source of a cartesian pattern is a wireless data link.

10. A method for controlling a Search and rescue (SAR) light on a rotorcraft, the SAR light configured to project a beam of light along a beam axis, the method comprising:
    at a controller having a processor programmed with a SAR program, performing the operations of:
        receiving real-time rotorcraft state data;
        receiving a cartesian input point;
        determining an initial light head orientation as a function of the real-time rotorcraft state;
        calculating a delta-orientation for the SAR light;
        generating a pan command and a tilt command as a function of delta-orientation for the SAR light; and
        transmitting the pan command and the tilt command; and wherein the cartesian input point is a one of a plurality of cartesian input points in a sequence defining the cartesian pattern, for each cartesian input point in the sequence defining the cartesian pattern,
identifying a delta-range;
generating a respective pan command and a respective tilt command;
zooming in on the field of view of the PTZ camera when the delta-range is positive; and
zooming out on the field of view of the PTZ camera when the delta-range is negative; and
at a pan control motor, causing the SAR light to pan responsive to the pan command;
at a tilt control motor, causing the SAR light to tilt responsive to the tilt command; and
at a pan-tilt-zoom (PTZ) camera configured to slave with the beam axis and to continuously have a field of view centered on the beam axis, capture a video stream and transmit it.

11. The method of claim 10, wherein generating the pan command and the tilt command includes generating an elevation and an azimuth with respect to the earth.

12. The method of claim 11, further comprising:
determining that the rotorcraft has deviated in three-dimensional space by more than a predefined threshold; and
adjusting pan and tilt commands accordingly.

13. The method of claim 12, further comprising: at a display system, receiving the video stream; and displaying it.

14. The method of claim 13, further comprising, receiving the cartesian pattern from a manual input device.

15. The method of claim 14, further comprising, receiving the cartesian pattern from a collective stick grip.

16. The method of claim 13, further comprising, receiving the cartesian pattern from a flight management system.

17. The method of claim 13, further comprising, receiving the cartesian pattern from a wireless data link.

18. A system to control a search and rescue (SAR) light on a rotorcraft, the SAR light configured to project a beam of light along a beam axis, the system comprising:
a pan control motor configured to cause the beam axis to pan responsive to a pan command;
a tilt control motor configured to cause the beam axis to tilt responsive to a tilt command;
a navigation system providing a real-time rotorcraft state, including a latitude, a longitude, and an orientation;
a source of a cartesian pattern comprising a plurality of cartesian input points in a sequence, the source of the cartesian pattern being selectable from among an input device, a flight management system, a memory device, and an external source;
a controller operationally coupled to the navigation system and the source of cartesian pattern, the controller having a processor to:
receive the cartesian pattern; and
for each cartesian input point in the sequence defining the cartesian pattern,
determine an initial light head orientation as a function of the real-time rotorcraft state;
generate a pan command and a tilt command as a function of the initial light head orientation and the cartesian input point;
transmit the pan command to the pan control motor and the tilt command to the tilt control motor; and
identify a delta-range; and
a pan-tilt-zoom (PTZ) camera configured to slave with the beam axis and to continuously have a field of view centered on the beam axis, the PTZ camera configured to:
capture a video stream and transmit it;
zoom in on the field of view of the PTZ camera when the delta-range is positive; and
zoom out on the field of view of the PTZ camera when the delta-range is negative.

* * * * *